Figure 1:
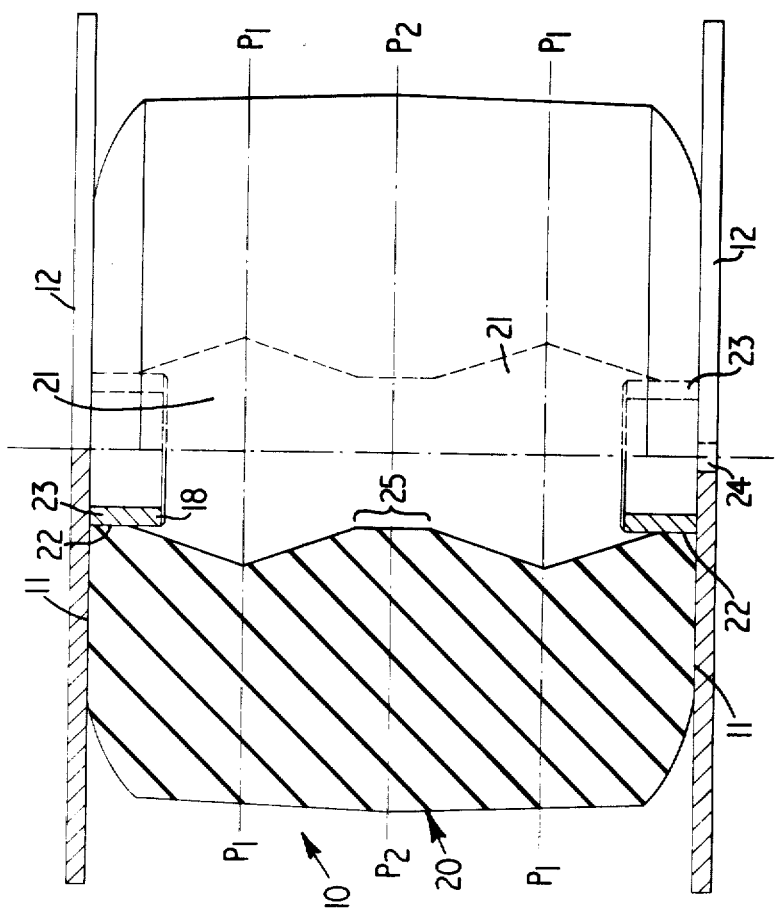

United States Patent [19]

Chalmers

[11] 4,053,148
[45] Oct. 11, 1977

[54] RUBBER SPRING AND VEHICLE SUSPENSION INCORPORATING SAID SPRING

[76] Inventor: Wallace G. Chalmers, 310 Victoria Ave., Montreal, Quebec, Canada, H3Z 2M9

[21] Appl. No.: 537,330

[22] Filed: Dec. 30, 1974

Related U.S. Application Data

[63] Continuation-in-part of Ser. No. 368,729, June 11, 1973.

[30] Foreign Application Priority Data

June 12, 1972 United Kingdom ............... 2728/72

[51] Int. Cl.$^2$ .......................................... B60G 11/22
[52] U.S. Cl. ................................. 267/63 R; 267/153
[58] Field of Search ............... 267/3, 6, 63, 140, 141, 267/152, 153, 20, 70, 71, 21 R, 21 A; 105/197 A, 199, 453, 224.1; 280/124, 671, 687, 716; 293/31, 87; 180/9, 54; 305/27; 308/138; 213/43

[56] References Cited

U.S. PATENT DOCUMENTS

| 3,144,247 | 8/1964 | Szonn et al. ........................... 267/63 |
| 3,161,420 | 12/1964 | Rix ....................................... 267/21 A |
| 3,212,460 | 10/1965 | Peras .................................... 105/453 |
| 3,409,284 | 11/1968 | Rix ....................................... 267/153 |
| 3,447,814 | 6/1969 | Siber et al. ........................... 280/124 |
| 3,679,166 | 7/1972 | Sturhan ................................ 267/153 |
| 3,858,925 | 1/1975 | Gaydecki ............................... 293/88 |

FOREIGN PATENT DOCUMENTS

| 534,543 | 1/1955 | Belgium ............................ 267/63 R |
| 974,288 | 11/1966 | United Kingdom ................. 267/63 |

Primary Examiner—James B. Marbert
Attorney, Agent, or Firm—Cushman, Darby & Cushman

[57] ABSTRACT

A rubber spring for vehicle suspensions of generally cylindrical form, and with smooth, uninterrupted external side faces, and having an axial cavity of divergent/convergent form. The cavity has a small cross-sectional area at the end faces of the spring, and has a maximum cross-sectional area preferably at two transverse planes spaced on opposite sides on the axial center of the spring. The cross-sectional area of the rubber is minimized at these two transverse planes, and is maximized at the central transverse plane which corresponds to the minimum diameter of the cavity. As used in a preferred suspension, the spring is held within a metal cylinder, which serves both to restrict lateral expansion so increasing the spring rate at heavy loads, and also applies frictional damping forces to the sides of the rubber spring.

8 Claims, 6 Drawing Figures

RUBBER SPRING AND VEHICLE SUSPENSION INCORPORATING SAID SPRING

This application is a continuation-in-part of U.S. patent application Ser. No. 368,729, filed June 11, 1973.

The present invention relates to springs, particularly for vehicle suspension systems, of the type consisting of an integral body of elastic material such as natural or synthetic rubber; and to vehicle suspensions utilizing such springs.

Various forms of rubber springs are known for suspension systems, these generally comprising a block of rubber having opposed, generally flat end faces which in use are subjected to compression, the block also having a cavity extending axially of the block between the faces. The block may be of generally cylindrical form, or may be elongated in cross-section for example as are the rubber springs 26 shown in my prior U.S. Pat. No. 3,315,979, which issued Apr. 25, 1967.

In order to obtain required compression characteristics for springs of substantial length, it is usually arranged that the spring should compress in such manner as to form a plurality of bulges or convolutions along its length. This allows the compressive, and other forces in the material, to be distributed along the length of the spring, rather than being over-much concentrated in one region. For this purpose the exterior of the spring has commonly been provided with circumferential depressions or waists at one or more transverse planes along the length of the spring. The internal cavity has generally been arranged to reflect the external shape, so that the walls of the spring are of roughly constant thickness throughout the length of the spring. In cases where the wall thickness is substantially uniform, the largest cross-sectional areas of resilient material will occur where these areas have the largest radius, i.e., where the cavity has its largest internal diameter. Examples of such springs are shown in Canadian Pat. No. 799,857 which issued Nov. 26, 1968, to Aeon Products Ltd., U.S. Pat. No. 2,822,165 which issued Feb. 4, 1958, to Bosihi, and U.S. Pat. No. 3,118,659 which issued Jan. 21 1964 to Paulsen. Another spring of this kind is shown in U.S. Pat. No. 3,447,814 to Siber. Although in this latter spring the internal cavity shape and external wall shape are not closely similar, this spring nevertheless has a depression or waist around the central transverse plane of the spring which corresponds to the minimum internal diameter of the cavity. This Siber spring also has 2 cavities, which become distorted when compressed by the lateral expansion of rubber between the cavities.

I have found that these known springs are subject to cracking in the area between the bulges which appear when the spring is highly compressed. For example, in the spring shown in U.S. Pat. No. 3,447,814, I have found that failure often occurred after less than 100,000 miles of use in a vehicle, primarily due to cracking in the central waist region. The present invention provides a spring which has a greatly extended life as compared to these known springs, for example more than 700,000 miles of vehicle travel have been achieved without spring failure, and the spring in accordance with this invention also has highly desirable load/deflection characteristics and self-damping properties. My invention also provides an advantageous mounting arrangement for rubber springs particularly for use in high load vehicles where a minimum amount of side sway is required.

A spring in accordance with the present invention comprises an integral body of elastic material such as rubber, said body having opposed end faces which in use are subjected to opposed compressive forces, in which the sides of the spring extending between the faces have substantially smooth contours uninterrupted by depressions and in which the body has an axial cavity extending between the faces, the cavity being of divergent/convergent form and having a relatively small cross-sectional area at the end faces and at a central plane between the end faces and having a maximum cross-sectional area at two transverse planes intermediate the respective end faces and said central plane whereby the cross-sectional area of the material in the body is minimized at said intermediate transverse planes, and the cross-sectional area of said material is maximized at the central plane between the end faces. With this design, the central transverse plane of the spring is reinforced, so that the centre of the spring is not subject to cracking, and bulging at the centre is minimized.

The cross-sectional area enclosed by the sides of the body is preferably substantially constant between the two transverse planes which correspond to the maximum areas of the cavity.

Preferably also, the maximum transverse dimension of the cavity at each of said two intermediate transverse planes is less than one half the transverse dimension between the sides of the body at the same plane.

According to another feature of the invention, a suspension system is provided using my rubber spring as described, the system including an unsprung suspension member, a sprung chassis member, means locating said suspension member for up and down and tilting movement relative to said chassis member, a rubber spring interposed between said suspension member and said chassis member, and a spring locating part bearing on to one of said members, said locating part having a cylindrical skirt extending therefrom by an amount not less than about one half the relatively uncompressed length of the spring between its faces when the spring is supporting an unloaded stationary vehicle. The skirt is spaced away from the sides of the spring when said spring is only supporting the unloaded stationary vehicle by an amount such as to allow contact between the spring and the skirt when the spring is axially compressed. The sides of the spring are shaped so that, when the spring is being compressed, portions of the spring sides adjacent the central transverse plane of the spring come firstly into contact with the skirt, so that frictional contact damps further compressive movements of the spring. The skirt is however arranged to be clear of contact with the sides of a portion of the spring even when the spring is at maximum compression.

Figure 2:
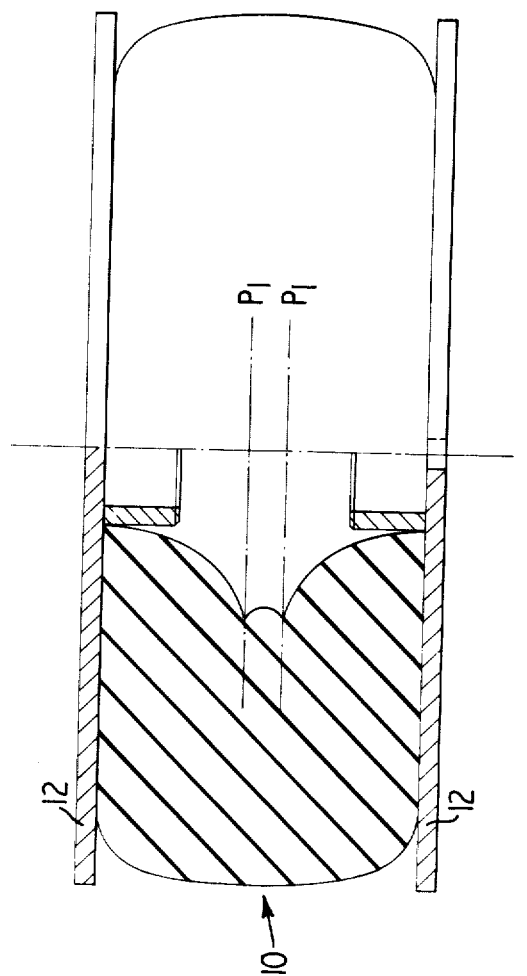
Figure 3:
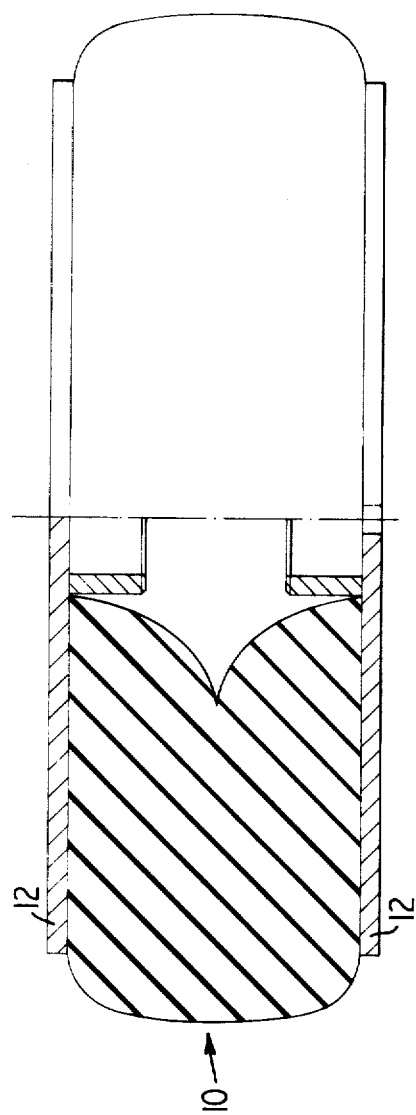
Figure 4:
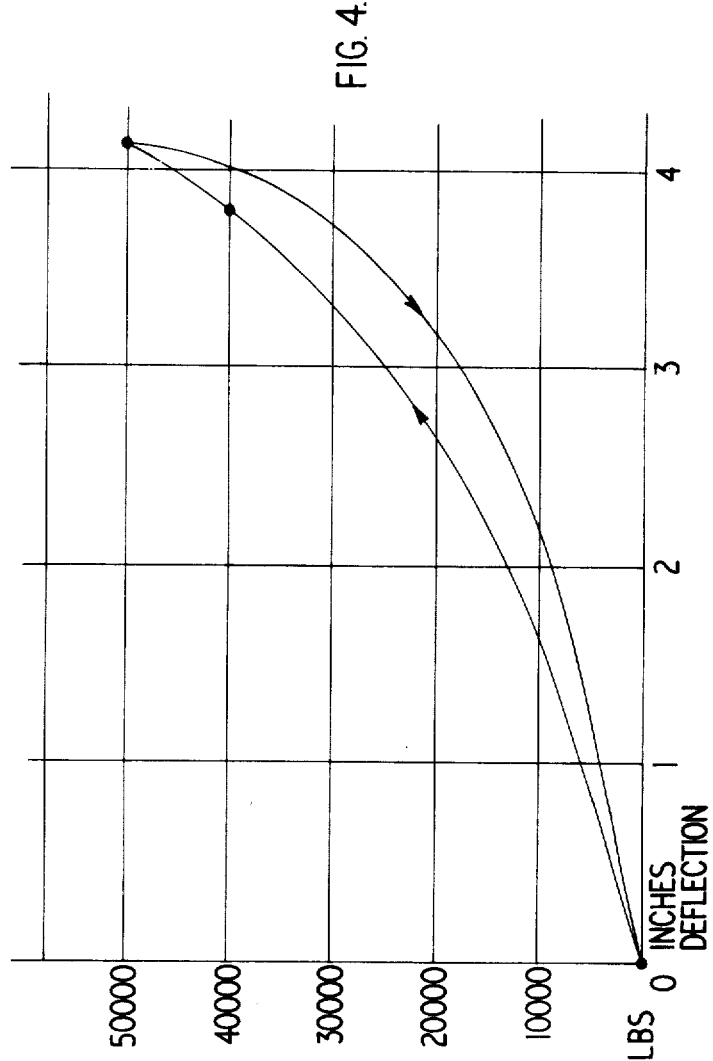
Figure 5:
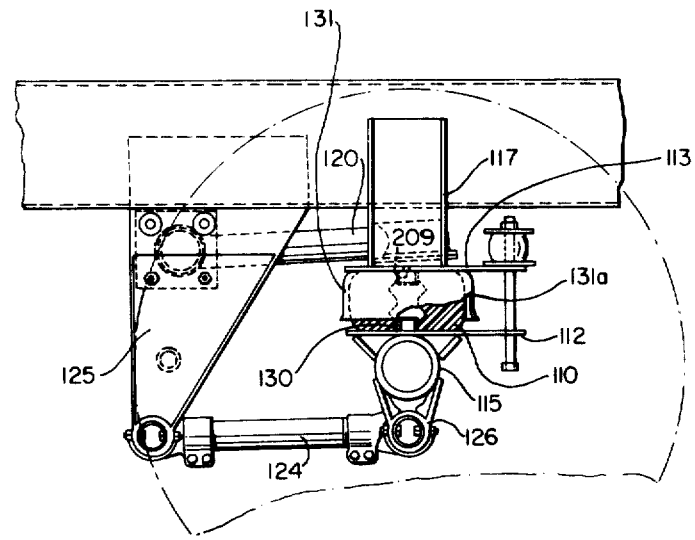
Figure 6:
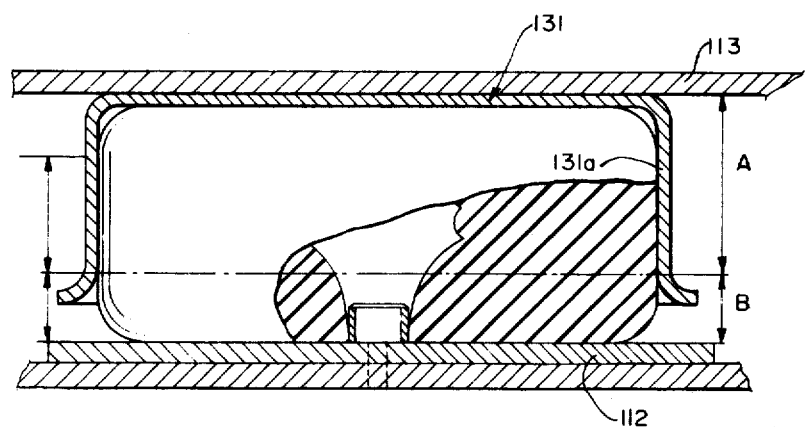

A preferred embodiment of the present invention will now be described by way of example with reference to the accompanying drawings in which:

FIG. 1 shows a partly sectioned elevation of a rubber spring in accordance with the invention, held between two flat, plates, while in the unstressed condition, FIG. 2 shows a similar view of the same spring when considerably compressed, FIG. 3 shows a similar view of the same spring at its maximum compression, FIG. 4 shows load/deflection curves for the spring, FIG. 5 shows a partially sectioned elevation through a spring mounted in a suspension system in accordance with another aspect of the invention, and FIG. 6 shows an enlarged view of the spring and associated parts of the system of FIG. 5 when the spring is compressed.

Referring to FIG. 1, the spring 10 is an integral body of natural rubber of generally cylindrical form having opposed end faces 11 held between flat pressure plates 12 by which the spring can be subjected to compression. The pressure plates 12 may be fixed to the sprung and unsprung parts of a vehicle suspension system, and may for example be the chassis side extensions (reference Nos. 13 and 14) and the side extensions (reference Nos. 28 and 29) of the walking beams all as shown in my prior U.S. Pat. No. 3,315,979.

As will be apparent from FIG. 1, the cylindrically curved sides 20 of the spring have substantially smooth uninterrupted contours, being slightly barrel shaped, and in particular have no waist or constriction in any central transverse plane. The desired compression characteristics of the spring are provided for by the specially shaped internal cavity 21, which extends axially between the two end faces 11. The cavity is of divergent/convergent form, to be described in more detail, and has a circular cross-section. The cavity includes two short parallel sided end portions 22, communicating with end faces 11, these being of relatively small cross-sectional area and being located by hollow spigots 23 projecting inwardly from the plates 12. These spigots 23 provide complete location for the spring, which does not require to be bonded to the plates. It may be noted that the lower pressure plate 12 is provided with a central small aperture 24, within the lower hollow spigot 23, and this allows air to be pumped in and out of the spring cavity with successive compressions and expansions. This flow of air helps to maintain the spring cool, and the restriction on the air flow also provides some damping for the spring movement.

The cavity 21 diverges from end portions 22, to reach a maximum diameter at transverse planes P1, each spaced about one-quarter (¼) the axial length of the spring from the adjacent end face 11. The diameter of the cavity at plane P1 is almost 1.5 times the diameter at the portions 22, and is slightly less than one-third the outer diameter of the spring at the same plane. Between the planes P1, the cavity converges (at an angle equal to the angle of divergence) to a short parallel sided bore portion 25 adjacent the axial centre of the body, which has the same diameter as portions 22. The cavity is symmetrical about a central transverse plane P2, and each half of the cavity on the sides of plane P2 is symmetrical about the respective plane P1.

The end faces 11 are partly convex, having a central area which is flat but having an outer annular region which slopes away from the plates 12 at an angle which increases with the radius. This has the effect of allowing a gradually increasing area of the spring to come into contact with the plates 12 while this is being compressed, giving a spring rate which increases with compression.

It is a feature of the spring that (ignoring the end portions which are of reduced diameter by reason of the convexity of the end faces) the greatest cross-sectional area of rubber is in the centre, and that those transverse planes, namely planes P1 and P2, having the largest cavity diameter, have the least cross-sectional area of rubber. This is in contrast to known springs of the type described. It will be understood that the term "cross-sectional area" refers to areas of the rubber or of the cavity in planes transverse to the axis joining the end faces.

It is believed that this latter feature of my spring, which amounts to a reinforcement of the central transverse plane of the spring, together with the absence of any central depression or waist which in known springs act as stress raisers, accounts for the exceptionally long life of my springs, as mentioned above. The presence of discontinuities in the cavity walls does not lead to the development of cracks, due presumably to the fact that these walls are not subject to tension when the spring is compressed. My springs also expand less, diametrically, when fully compressed, than prior art springs described above, making for more compact design of suspensions.

FIGS. 2 and 3 show different stages of compression of the same spring. FIG. 2, which corresponds to a total of 40,000 lbs. of pressure, shows the sides of the spring bulged outwardly, but without any discontinuity such as occurs with the known springs. The cavity 21, however, has considerably altered its shape in such a way that the planes P1 and P2 have moved close together. In FIG. 3, which corresponds to 50,000 lbs. of pressure, the sides are bulged out further still, and the planes P1 and P2 of the cavity, i.e., those planes where the cross-sectional area of the cavity is largest, have moved to the axial centre so that these planes have met.

FIG. 4 shows the load deflection curve, the solid lines relating to the spring as described. It will be seen that the upper solid curve, which represents compression of the spring, is smooth, indicating a gradually increasing spring rate as the spring is compressed. The lower solid curve, which represents expansion of the spring, is spaced from the upper curve by an amount which represents the hysteresis loss in the spring, which also contributes to the damping in the suspension system. The variable increasing spring rate is desirable in order that a vehicle can have a similar ride both when lightly loaded and when heavily loaded.

FIGS. 5 and 6 show a mounting arrangement for the spring which is preferred in vehicles having a high centre of gravity, and where it is essential to minimize side sway. This arrangement is also used in dump trucks where there is a danger of the truck tipping over when the dump body is raised.

FIG. 5 shows an elevation of a single axle suspension, in which rubber springs 110 are disposed between horizontal plates 112 and 113 held respectively at each end of an unsprung axle 115 and by sprung vehicle chassis members 117. The axle is located relative to chassis members 117 by a torque rod arrangement including upper torque rod means in the form of a wishbone component 120 connected between brackets 121 and a ball member at the top of a central pillar (not shown) on axle 115, and lower torque rod means 124 connected between the lower end of brackets 125 and the axle brackets 126. This torque rod arrangement is identical to that described with reference to FIG. 10 of my U.S. Pat. No. 3,792,871, and therefore will not further be described. However for present purposes it is to be understood that the torque rod arrangement locates the axle 115 completely in fore-and-aft and sideways directions, allowing the axle to move vertically (with minimal rotation) and to tilt about a central fore-and-aft axis, and also resists torsion in the axle. The rubber springs, located near the ends of the axle, are thus subjected to compression (with some bending when the axle tilts), but are not subjected to shear forces. The location of the axle 115 by the torque rod arrangement will clearly be such as to subject the springs principally to distortion by compression along their axes, with negligible twisting about their axes.

Each spring 110 is located relative to the lower plate 112 by a spigot 130 extending upwardly from plate 112 into the spring cavity. Each spring is free to slide against the upper plate 113, within the confines of a locating part 131 which is a pressing of ⅛ inch or 3/16 inch steel plate, having a circular flat portion slidably bearing on plate 113 and having a cylindrical skirt 131a depending from this flat portion. The lack of any permanent attachment between upper plate 113 and part 131 makes for easy replacement of the spring; the spring itself, being located by spigot 130, serves to locate part 131. The skirt 131a extends downwards by an amount slightly greater than one half the length of the spring when the spring is supporting an unladen truck body; this amount being roughly half the length of the spring when completely unstressed. The skirt is of such diameter, relative to the spring diameter, as to be spaced away from the sides of the spring when the truck is unladen, so that, as in the embodiment of spring previously described, the spring has freely exposed sides. However, the dimensions of the parts, and the shape of the spring sides, are such that when the spring is compressed by loading the vehicle or driving this over rough ground, portions of the spring sides adjacent the central plane of the spring come into contact with the skirt, increasing the spring rate, and providing slight damping due to friction between the spring sides and the skirt. The spring rate and damping both increase gradually with increasing compression.

FIG. 6 shows a condition in which the spring is even more compressed, in fact close to maximum loading, and it will be noted that even when subjected to this high compression, a lower portion of the spring remains free of interference from the skirt, so that some further compression of this bottom portion is possible. The suspension thus remains sensitive even at very high loads. it may be noted that the skirt is shorter than the minimum length of the spring. With this arrangement, stresses in the spring are less than they would be without part 131, since this part supports the spring and limits its diametral growth under extreme conditions.

The characteristics of the spring on compression, as confined by the skirt shown in FIGS. 5 and 6, are shown by the broken line in FIG. 4, which clearly shows the rapid increase in spring rate during the final compression stages.

It will be understood that for tandem axle suspension of the types shown in my U.S. Pats. Nos. 3,315,979 and 3,792,871, the locating part is attached to the chassis member normally receiving the rubber spring, and the unsprung part corresponding to axle 115 would be the beams which are supported and located by the tandem axles.

The embodiments of the present invention in which an exclusive property or privilege is claimed are defined as follows:

1. A suspension system for vehicle including a sprung chassis member and an unsprung suspension member movable vertically underneath said chassis member, said members being separated by a spring, said suspension member being located by torque rod means so that distortion of the spring occurs principally by axial compression, said spring comprising an integral body of elastic material such as rubber, said body having opposed end faces, and in which the body has freely exposed sides extending between said end faces and having substantially smooth contours uninterrupted by depressions, the body having an axial cavity extending between said faces, said cavity being of divergent/convergent form and having a relatively small cross-sectional area at the end faces and at a central plane between the end faces and having a maximum cross-sectional area at two transverse planes intermediate the respective end faces and said central plane whereby the cross-sectional area of the material in the body is minimized at said transverse planes and the cross-sectional area of said material is maximized at the central plane between the end faces, the maximum transverse dimension of said cavity at each of said two transverse planes being less than one half the transverse dimension between the sides of the body at the same plane;

said spring being characterized by bulging less, radially outwardly under full axial compressive load, than would be the case were the same spring to have an exterior waist at said central transverse plane and have its largest transverse cross-sectional areas where said cavity is of largest internal diameter.

2. A suspension system according to claim 1, wherein said maximum transverse dimension of said cavity at each of said one or more transverse planes is less than one third the transverse dimension between the sides of the body at the same plane.

3. A suspension system according to claim 1, wherein said body is circular in cross-section, and has a single central cavity.

4. A suspension for vehicle including a sprung chassis member and an unsprung suspension member movable vertically underneath said chassis member, said members being separated by a spring, said suspension member being located by torque rod means so that distortion of the spring occurs principally by axial compression, said spring comprising an integral body of rubber having opposed circular end faces, and having freely exposed generally cylindrical side walls extending between said end faces, said side walls having substantially smooth contours uninterrupted by depressions, the body having an axial cavity of circular cross section extending between said end faces, said cavity being of divergent/convergent form, said cavity diverging from adjacent each end face to an area of maximum cross-section at a plane spaced between said respective end face and the axial centre of the body, said cavity converging from each of said planes towards the axial centre of the body, said cavity having a portion of substantially constant diameter adjacent the axial centre of the body, the diameter of said areas of maximum cross section of the cavity being less than one half the outside diameter of the body at said planes, and wherein the cross-sectional area of the material enclosed by the side walls of the body is substantially constant between said two planes whereby the cross sectional area of rubber is minimized at said planes, said spring being characterized by bulging less, radially outwardly under full axial compressive load, than would be the case were the same spring to have an exterior waist at said central transverse plane and have its largest transverse cross-sectional areas where said cavity is of largest internal diameter.

5. A suspension system according to claim 4, wherein the diameter of said area of maximum cross-section of the cavity is less than one third the outside diameter of the body at said planes.

6. A suspension system according to claim 4, having partly convex end faces.

7. A suspension system for vehicles, comprising an unsprung suspension member and a sprung chassis member, means locating said suspension member for up and down and tilting movement relative to said chassis member, a rubber spring interposed between said suspension member and said chassis member, said spring comprising an integral body of elastic material such as rubber, said body having opposed end faces engaging the suspension and chassis members respectively, the sides of said body extending between said end faces having substantially smooth contours uninterrupted by depressions, the body having a substantially circular cross section and a single axial cavity extending between said faces, said cavity being of divergent/convergent form and having a relatively small cross-sectional area at the end faces and at a central plane between the end faces and having a maximum cross-sectional area at two transverse planes intermediate the respective end faces and said central plane whereby the cross-sectional area of the material in the body is minimized at said transverse planes and the cross-sectional area of said material is maximized at the central plane between the end faces, the maximum transverse dimension of said cavity at each of said two transverse planes being less than one half the transverse dimension between the sides of the body at the same plane, said suspension system further comprising a spring locating part bearing on one of said members, said part having a cylindrical skirt surrounding said rubber spring and extending along said spring for not less than about one half of its relatively uncompressed length when the spring is supporting an unloaded stationary vehicle, said skirt being spaced away from the sides of the spring when said spring is in its relatively uncompressed state, the sides of the spring being shaped so that when the spring is being compressed portions of the spring sides adjacent the central transverse plane of the spring come firstly into contact with the skirt, so that frictional contact between spring and skirt damp the further compressive movements of the spring, the skirt being arranged to be clear of contact with the sides of a portion of the spring even when the spring is at its maximum compression.

8. A suspension system according to claim 7, wherein said rubber spring is located relative to said one of the chassis members solely by a spigot extending into one end of the spring cavity.

* * * * *